(12) United States Patent
Lin et al.

(10) Patent No.: US 8,134,662 B2
(45) Date of Patent: Mar. 13, 2012

(54) PIXEL STRUCTURE OF TRANSFLECTIVE LIQUID CRYSTAL DISPLAY ARRAY SUBSTRATE AND METHOD FOR FABRICATING THE SAME

(75) Inventors: Yung-Lun Lin, Hsin-Chu (TW); Hsiu-Chi Tung, Hsin-Chu (TW); Li-Ping Liu, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 0 days.

(21) Appl. No.: 13/225,599

(22) Filed: Sep. 6, 2011

(65) Prior Publication Data

US 2012/0019751 A1     Jan. 26, 2012

Related U.S. Application Data

(62) Division of application No. 12/189,913, filed on Aug. 12, 2008, now Pat. No. 8,049,847.

(30) Foreign Application Priority Data

Nov. 2, 2007 (TW) ............................... 96141536 A

(51) Int. Cl.
    *G02F 1/1335*    (2006.01)
(52) U.S. Cl. .................... 349/114; 349/38; 349/138
(58) Field of Classification Search .................. 349/114, 349/113, 38, 143, 139, 138
See application file for complete search history.

(56) References Cited

U.S. PATENT DOCUMENTS

| | | | |
|---|---|---|---|
| 6,100,947 A | 8/2000 | Katayama | |
| 7,199,396 B2 | 4/2007 | Lebrun | |
| 7,532,263 B2 | 5/2009 | Lee et al. | |
| 7,576,720 B2 | 8/2009 | Lin et al. | |
| 7,791,692 B2 * | 9/2010 | Choi et al. | .................... 349/114 |
| 2005/0161677 A1 | 7/2005 | Jung et al. | |
| 2006/0250551 A1 | 11/2006 | Kim | |
| 2007/0171320 A1 | 7/2007 | Lin | |

FOREIGN PATENT DOCUMENTS

| | | |
|---|---|---|
| JP | 2007-108513 | 4/2007 |
| TW | I273313 | 2/2007 |
| TW | 200712633 | 4/2007 |

OTHER PUBLICATIONS

English language translation of abstract of TW I273313 (published Feb. 11, 2007).
English language translation of abstract of TW 200712633 (published Apr. 1, 2007).
English language translation of abstract of JP 2007-108513 (published Apr. 26, 2007).

* cited by examiner

*Primary Examiner* — Thoi Duong
(74) *Attorney, Agent, or Firm* — Thomas, Kayden, Horstemeyer & Risley, LLP

(57) ABSTRACT

A pixel structure of a transflective liquid crystal display array substrate includes a first patterned conductive layer, a second patterned conductive layer, a transparent patterned conductive layer, a passivation layer, and a patterned reflective metal layer. A first part of the second patterned conductive layer and a first part of the first patterned conductive layer form a first storage capacitor. The first part of the second patterned conductive layer and the transparent patterned conductive layer form a second storage capacitor. The passivation layer is formed to cover the patterned transparent conductive layer and has an opening to expose a part of the patterned transparent conductive layer. The patterned reflective metal layer is formed to cover the passivation layer and electrically connected with the patterned transparent conductive layer via the opening. A method for fabricating the pixel structure of the transflective liquid crystal display array substrate is also disclosed.

10 Claims, 8 Drawing Sheets

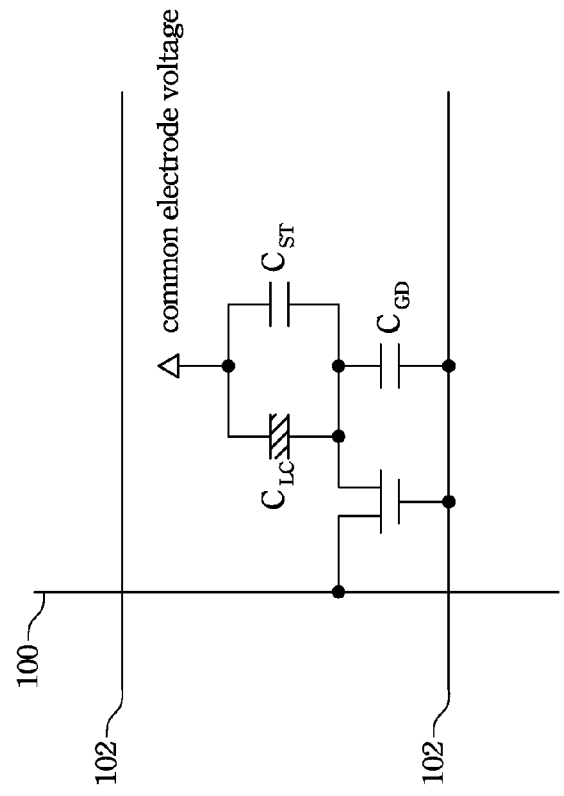
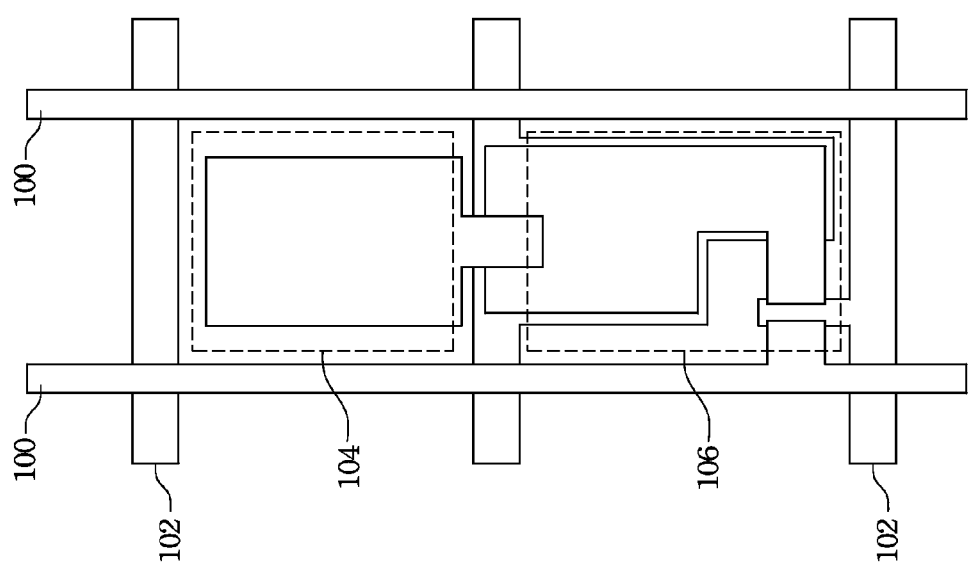
Fig. 1A
(PRIOR ART)
Fig. 1B
(PRIOR ART)

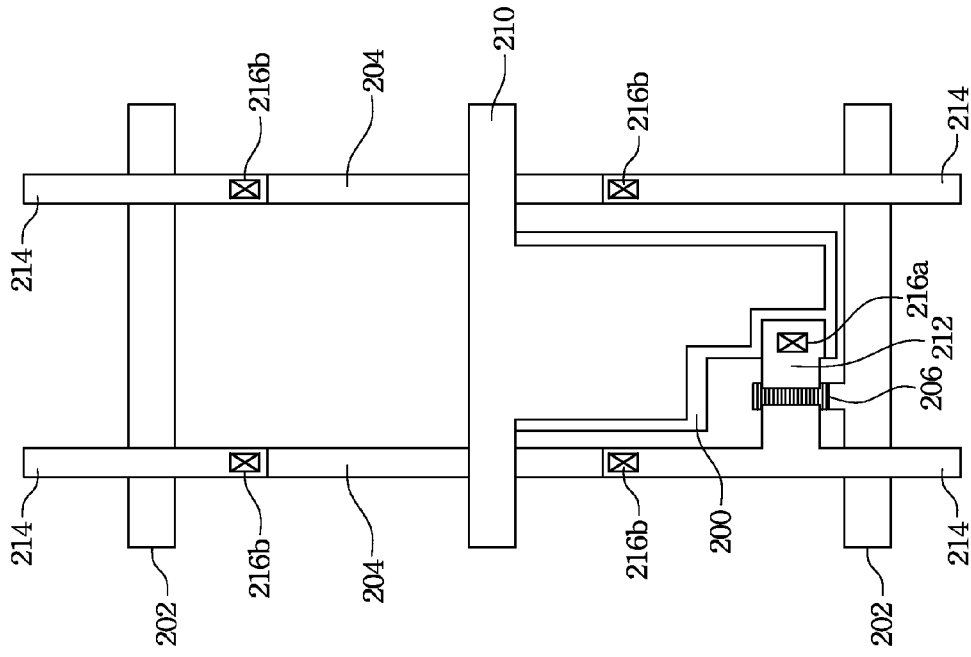
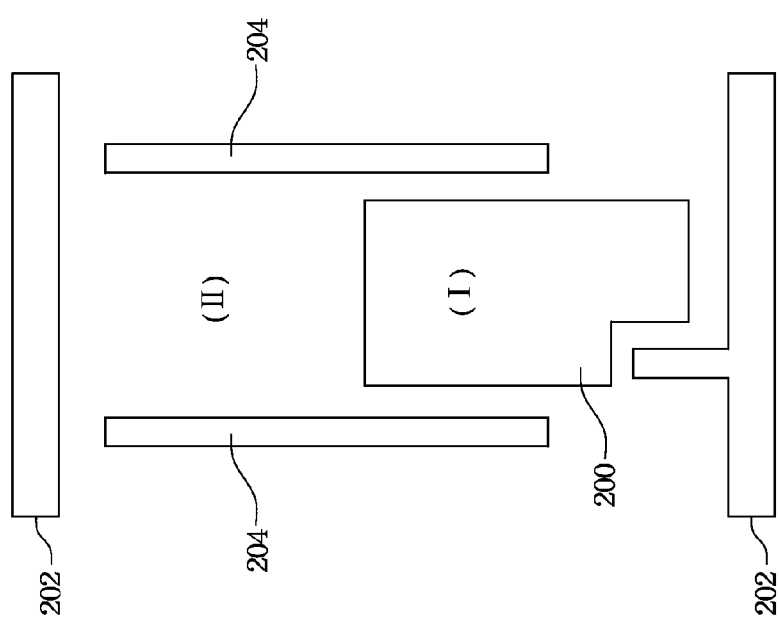
Fig. 2B
Fig. 2A

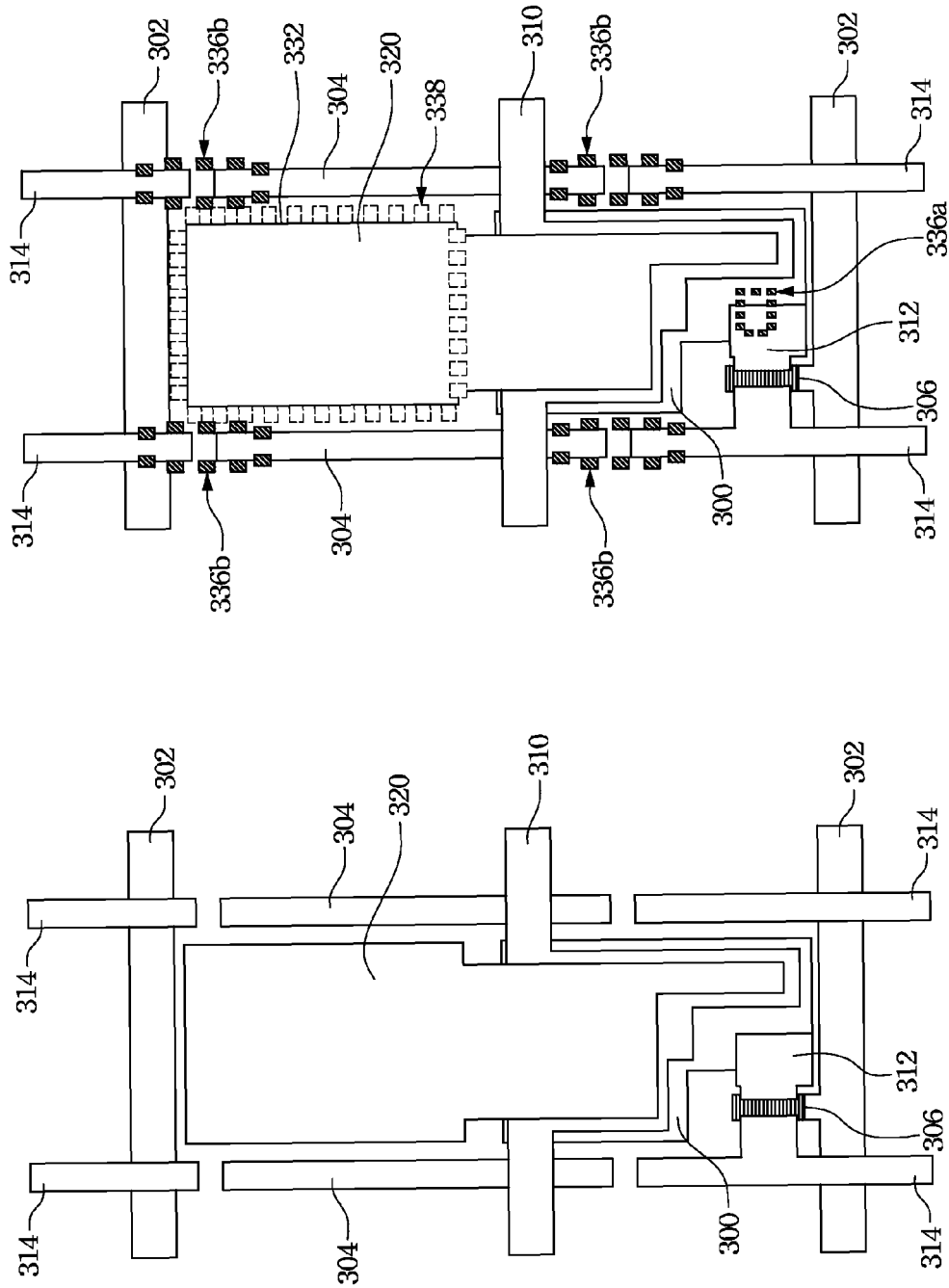

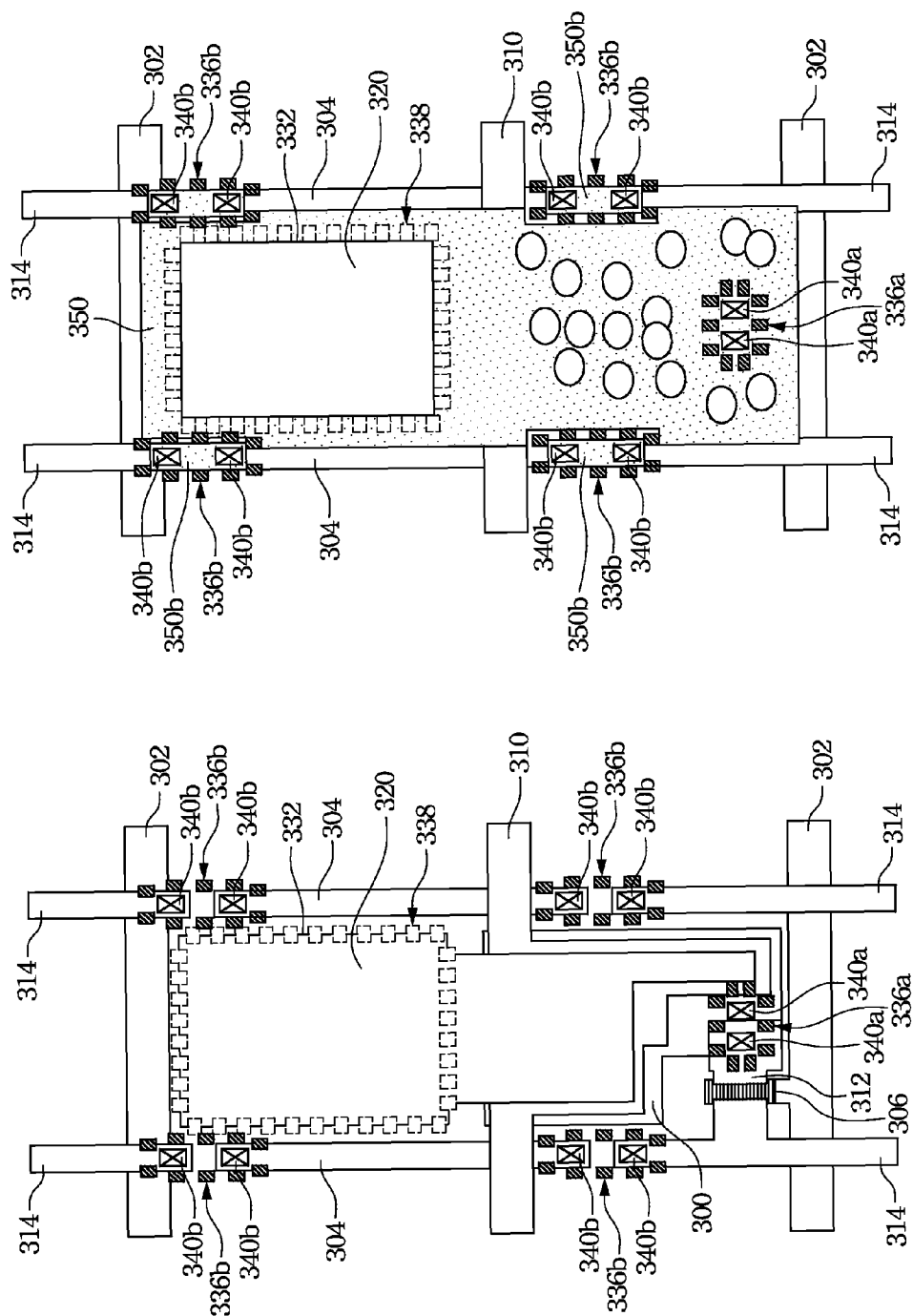

PIXEL STRUCTURE OF TRANSFLECTIVE LIQUID CRYSTAL DISPLAY ARRAY SUBSTRATE AND METHOD FOR FABRICATING THE SAME

This is a divisional application of patent application Ser. No. 12/189,913 filed on Aug. 12, 2008, now allowed. The prior application Ser. No. 12/189,913 claims the benefit of Taiwan Patent Application No. 96141536 filed on Nov. 2, 2007, the disclosures of which are incorporated herein by reference in their entirety.

BACKGROUND

1. Field of Invention

The present invention relates to a liquid crystal display array substrate and a fabricating method thereof. More particularly, the present invention relates to a pixel structure of a transflective liquid crystal display array substrate and a fabricating method thereof.

2. Description of Related Art

FIG. 1A illustrates a conventional pixel structure of a transflective liquid crystal display array substrate. The pixel structure is formed by data lines 100 crisscrossing scan lines 102 and includes a transparent part 104 and a reflective part 106. A backlight provided by a backlight module is transmitted to liquid crystal layers through the transparent part 104, and an outer light source is transmitted back to the liquid crystal layers after being reflected by the reflective part 106.

FIG. 1B illustrates an equivalent circuit of the pixel structure shown in FIG. 1A. The equivalent circuit includes a liquid crystal capacitor $C_{LC}$, a parasitic capacitor $C_{GD}$ and a storage capacitor $C_{ST}$, in which the storage capacitor $C_{ST}$ is usually arranged in the reflective part of the pixel structure and formed by a metal conductive layer coupled to a common electrode voltage overlapping another metal conductive layer coupled to a pixel electrode voltage. The storage capacitor $C_{ST}$ interacts with the liquid crystal capacitor $C_{LC}$ during the charge operation of the pixel structure, so as to reduce the voltage drop, i.e. feed-through voltage drop, caused by the parasitic capacitor $C_{GD}$ after the charge operation of the pixel structure.

However, the size of the reflective part limits the capacitance of the storage capacitor $C_{ST}$. Particularly for the liquid crystal display with higher resolution, the area of the pixel structure (or the reflective area) becomes smaller, so the capacitance of the storage capacitor $C_{ST}$ accordingly becomes smaller.

SUMMARY

In accordance with one embodiment of the present invention, a pixel structure of a transflective liquid crystal display array substrate is provided. The pixel structure comprises a first patterned conductive layer, a first interlayer dielectric layer, a second patterned conductive layer, a second interlayer dielectric layer, a patterned transparent conductive layer, a passivation layer, and a patterned reflective metal layer. The first patterned conductive layer is formed on a substrate and has a first part coupled to a pixel electrode voltage. The first interlayer dielectric layer is formed to cover the first patterned conductive layer. The second patterned conductive layer is formed on the first interlayer dielectric layer and has a first part coupled to a common electrode voltage, in which the first part of the second patterned conductive layer together with the first part of the first patterned conductive layer form a first storage capacitor. The second interlayer dielectric layer is formed to cover the second patterned conductive layer. The patterned transparent conductive layer is formed on the second interlayer dielectric layer and coupled to the pixel electrode voltage, in which the patterned transparent conductive layer together with the first part of the second patterned conductive layer form a second storage capacitor. The passivation layer is formed to cover the patterned transparent conductive layer and the substrate, the passivation layer having an opening to expose a part of the patterned transparent conductive layer. The patterned reflective metal layer is formed to cover the passivation layer and electrically connected with the patterned transparent conductive layer via the opening.

In accordance with another embodiment of the present invention, a method for fabricating a transflective liquid crystal display array substrate is provided. The method comprises the steps of: forming a first patterned conductive layer on a substrate, wherein a first part of the first patterned conductive layer is coupled to a pixel electrode voltage; forming a first interlayer dielectric layer to cover the first patterned conductive layer; forming a second patterned conductive layer on the first interlayer dielectric layer, wherein a first part of the second patterned conductive layer is coupled to a common electrode voltage, and the first part of the second patterned conductive layer together with the first part of the first patterned conductive layer form a first storage capacitor; forming a second interlayer dielectric layer to cover the second patterned conductive layer; and forming a patterned transparent conductive layer on the second interlayer dielectric layer, wherein the patterned transparent conductive layer is coupled to the pixel electrode voltage, and the patterned transparent conductive layer together with the first part of the second patterned conductive layer form a second storage capacitor; forming a passivation layer on the patterned transparent conductive layer; etching the passivation layer to form an opening to expose a part of the patterned transparent conductive layer; and forming a patterned reflective metal layer to cover the passivation layer, wherein the patterned reflective metal layer electrically connects with the patterned transparent conductive layer via the opening.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference to the accompanying drawings as follows:

FIG. 1A illustrates a conventional pixel structure of a transflective liquid crystal display array substrate;

FIG. 1B illustrates an equivalent circuit of the pixel structure shown in FIG. 1A;

FIGS. 2A-2D illustrate a fabrication process of a transflective liquid crystal display array substrate according to one embodiment of the present invention;

FIGS. 3A-3F illustrate a fabrication process of a transflective liquid crystal display array substrate according to another embodiment of the present invention.

DESCRIPTION OF THE PREFERRED EMBODIMENTS

In the following detailed description, the embodiments of the present invention have been shown and described. As will be realized, the invention is capable of modification in various respects, all without departing from the invention. Accordingly, the drawings and description are to be regarded as illustrative in nature, and not restrictive.

Figure 2C:
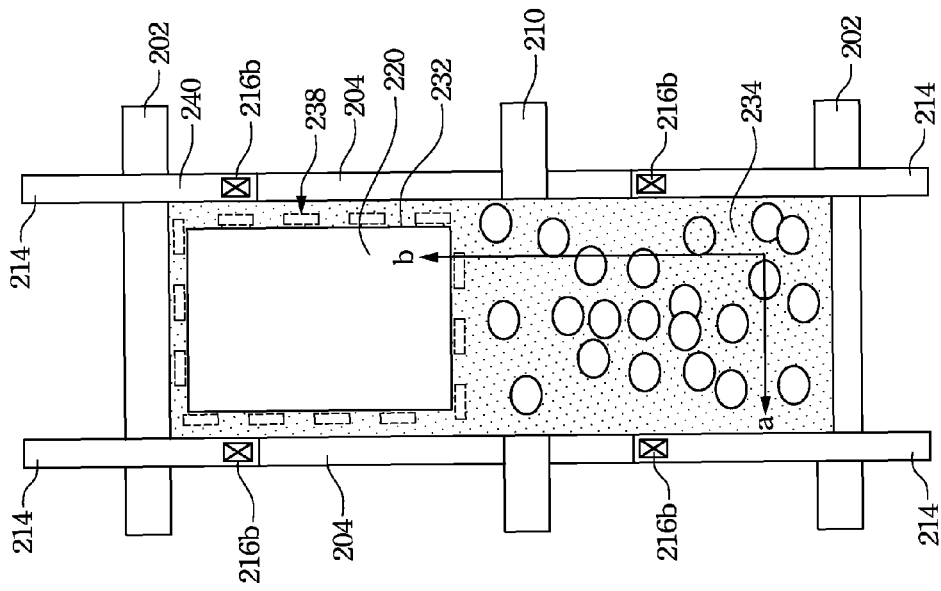

FIGS. 2A-2D illustrate a fabrication process of a transflective liquid crystal display array substrate according to one embodiment of the present invention. In the present embodiment, a pixel structure in the liquid crystal display array substrate includes a first area (I) and a second area (II), in which the first area (I) is, for example, a reflective area, and the second area (II) is, for example, a transparent area. Referring to FIG. 2A, a first patterned conductive layer is first formed on a substrate (not shown). The first patterned conductive layer includes a first part 200, a second part 202 and a third part 204. The first part 200 of the first patterned conductive layer is arranged in the first area (I) of the pixel structure and coupled to a pixel electrode voltage. The second part 202 of the first patterned conductive layer is used as a scan line of the liquid crystal display array substrate and also as a gate electrode of a thin film transistor. The third part 204 of the first patterned conductive layer is used as an underlayer data line segment of the liquid crystal display array substrate. Then, a first interlayer dielectric layer 201 (shown in FIG. 2E) is formed on the substrate to cover the first area (I) and the second area (II) of the pixel structure.

Referring to FIG. 2B, a patterned semiconductor layer 206 is then formed on the first interlayer dielectric layer 201 over the aforementioned gate electrode, in which the material of the patterned semiconductor layer 206 can be, for example, amorphous silicon (α-Si), such that the thin film transistor can be formed as an α-Si thin film transistor. After that, a second patterned conductive layer is formed on the patterned semiconductor layer 206 and the first interlayer dielectric layer 201. The second patterned conductive layer includes a first part 210, a second part 212 and a third part 214. The first part 210 of the second patterned conductive layer is arranged on the first interlayer dielectric layer 201 of the first area (I) of the pixel structure. The first part 210 of the second patterned conductive layer is used as a common line of the liquid crystal display array substrate and coupled to a common electrode voltage. The first part 210 of the second patterned conductive layer together with the first part 200 of the first patterned conductive layer form a first storage capacitor $C_{ST1}$ (shown in FIG. 2E) when they are coupled to the common electrode voltage and the pixel electrode voltage, respectively. The second part 212 of the second patterned conductive layer is used as a drain electrode of the thin film transistor and electrically connects with the first part 200 of the first patterned conductive layer. The third part 214 of the second patterned conductive layer is used as a source electrode of the thin film transistor and also used as an upperlayer data line segment of the liquid crystal display array substrate, so as to electrically connect with the third part 204 of the first patterned conductive layer to form the data line of the liquid crystal display array substrate. Then, a second interlayer dielectric layer 221 (shown in FIG. 2E) is formed to cover the foregoing structure in the first area (I) and the second area (II) of the pixel structure.

In addition, the first interlayer dielectric layer 201 can be etched to have a first contact hole 216a, for the second part 212 of the second patterned conductive layer to electrically connect with the first part 200 of the first patterned conductive layer, and to have a plurality of contact holes 216b, for the third part 214 of the second patterned conductive layer to electrically connect with the third part 204 of the first patterned conductive layer to form the data line of the liquid crystal display array substrate.

Referring to FIG. 2C, a patterned transparent conductive layer 220 is then formed on the second interlayer dielectric layer 221 of the first area (I) and the second area (II), so as to form a transparent part in the second area (II) of the pixel structure in the transflective liquid crystal display array substrate. The material of the patterned transparent conductive layer 220 can include transparent conductive material such as Indium Tin Oxide (ITO), Indium Zinc Oxide (IZO), etc. Furthermore, the patterned transparent conductive layer 220 electrically connects with the second part 212 of the second patterned conductive layer and is coupled to the pixel electrode voltage. The patterned transparent conductive layer 220 and the first part 210 of the second patterned conductive layer form a second storage capacitor $C_{ST2}$ (shown in FIG. 2E). Moreover, the second interlayer dielectric layer 221 can be etched to have at least one second contact hole 222, for the patterned transparent conductive layer 220 to electrically connect with the second part 212 of the second patterned conductive layer.

Figure 2D:
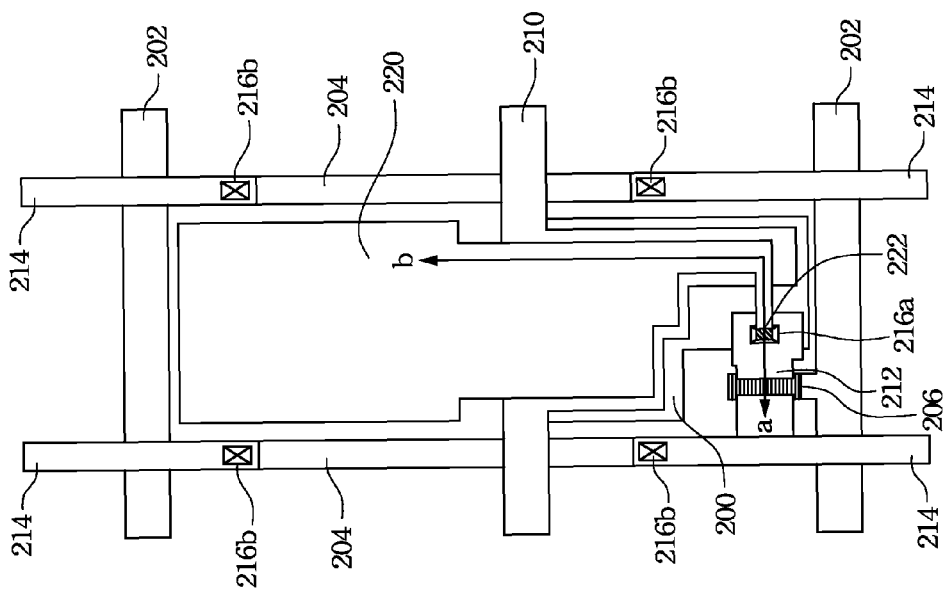

Referring to FIG. 2D, a passivation layer 230 (shown in FIG. 2F) is then formed to cover the foregoing structure in the first area (I) and the second area (II), in which the passivation layer 230 has an opening 232 to expose a part of the patterned transparent conductive layer 220 in the second area (II). At last, a patterned reflective metal layer 234 is formed to cover the passivation layer 230 in the first area (I) and the second area (II). The patterned reflective metal layer 234 also electrically connects with the patterned transparent conductive layer 220, so as to form a reflective part in the first area (I) of the pixel structure in the transflective liquid crystal display array substrate. The material of the patterned reflective metal layer 234 can include conductive material, such as aluminum, etc. Furthermore, during the patterning process for the patterned reflective metal layer 234, only a portion of the patterned reflective metal layer 234 at the central area of the opening 232 is removed and a portion of the patterned reflective metal layer 234 at the peripheral area of the opening 232 is thus left, such as the dotted line 238 shown in FIG. 2D, so that the patterned reflective metal layer 234 electrically connects with the patterned transparent conductive layer 220. In addition, the passivation layer 230 on the patterned transparent conductive layer 220 can be selectively formed. In one embodiment, the passivation layer 230 is not formed on the patterned transparent conductive layer 220; instead, the patterned reflective metal layer 234 is formed directly on the patterned transparent conductive layer 220.

Figure 2E:
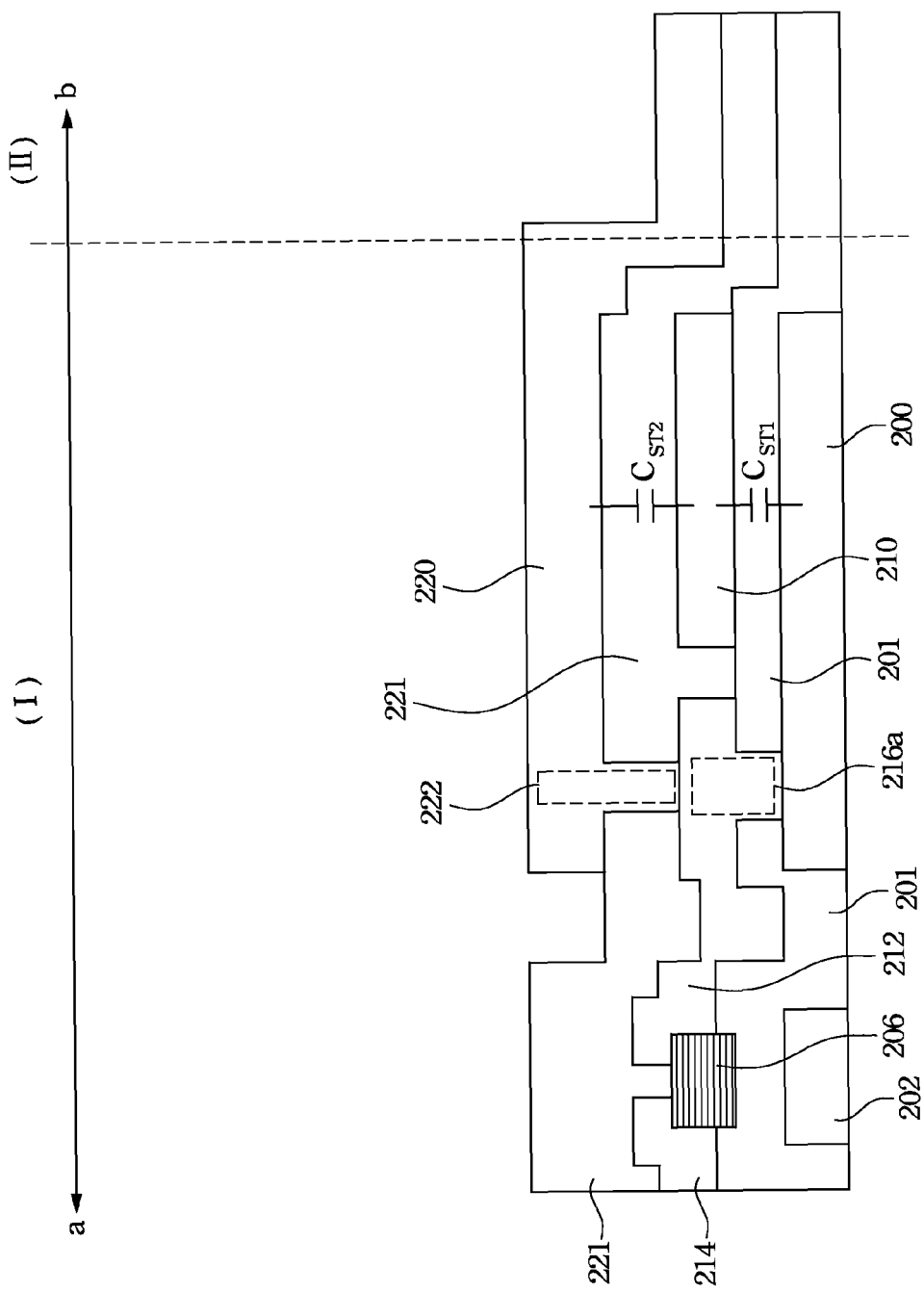
FIG. 2E illustrates a sectional view of part a-b in FIG. 2C.

FIG. 2E illustrates a sectional view of part a-b in FIG. 2C. As shown in FIG. 2E, the first part 200 of the first patterned conductive layer, which is coupled to the pixel electrode voltage, together with the first part 210 of the second patterned conductive layer, which is coupled to the common electrode voltage, form the first storage capacitor $C_{ST1}$. The first part 210 of the second patterned conductive layer, which is coupled to the common electrode voltage, together with the patterned transparent conductive layer 220, which is coupled to the pixel electrode voltage, form the second storage capacitor $C_{ST2}$. In addition, the first interlayer dielectric layer 201 is etched to have the first contact hole 216a, for the second part 212 of the second patterned conductive layer to electrically connect with the first part 200 of the first patterned conductive layer, and the second interlayer dielectric layer 221 is also etched to have the second contact hole 222, for the patterned transparent conductive layer 220 to electrically connect with the second part 212 of the second patterned conductive layer, such that the patterned transparent conductive layer 220 can electrically connect with the first part 200 of the first patterned conductive layer through the first contact hole 216a and the second contact hole 222, to be coupled to the pixel electrode voltage.

Figure 2F:
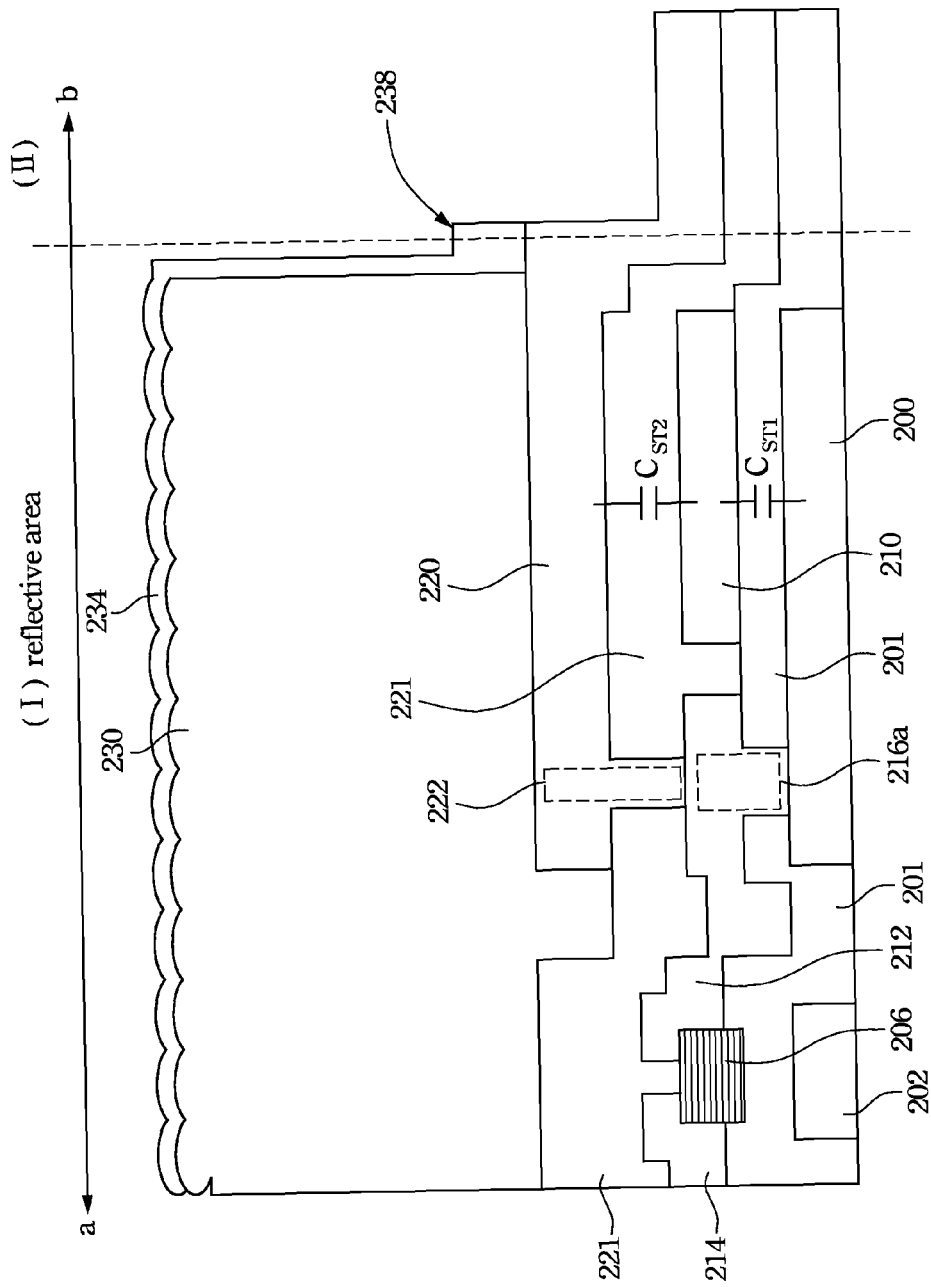
FIG. 2F illustrates a sectional view of part a-b in FIG. 2D.

FIG. 2F illustrates a sectional view of part a-b in FIG. 2D. As shown in FIG. 2F, the passivation layer 230 is formed to cover the patterned transparent conductive layer 220 and the second interlayer dielectric layer 221 in the first area (I), and the patterned reflective metal layer 234 is formed to cover the passivation layer 230. That is, the first patterned conductive layer, the first interlayer dielectric layer 201, the second patterned conductive layer, the second interlayer dielectric layer 221 and the patterned transparent conductive layer 220 are all arranged in between the patterned reflective metal layer 234 and the substrate. The patterned reflective metal layer 234 is formed to cover the side wall of the passivation layer 230 and also cover a part of the patterned transparent conductive layer 220 at the peripheral area of the opening 232. During the patterning process, only the patterned reflective metal layer 234 at the central area of the opening 232 is removed and the patterned reflective metal layer 234 at the peripheral area of the opening 232 is thus left, such as the dotted line 238 shown in FIG. 2D (or the peripheral area 238 of the opening 232 shown in FIG. 2F), so that the patterned reflective metal layer 234 electrically connects with the patterned transparent conductive layer 220.

Figure 3B:
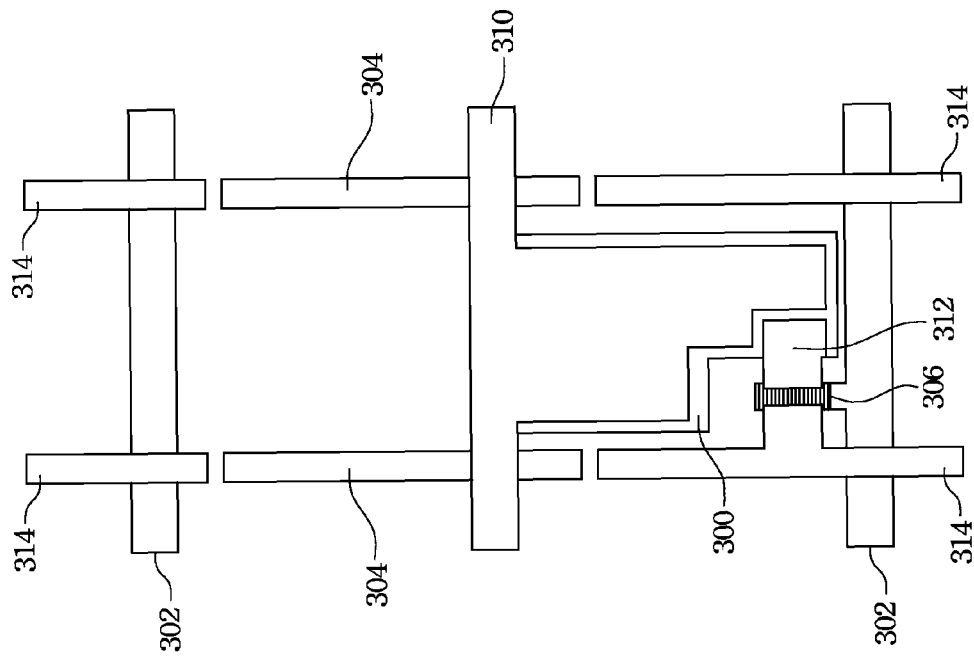
Figure 3A:
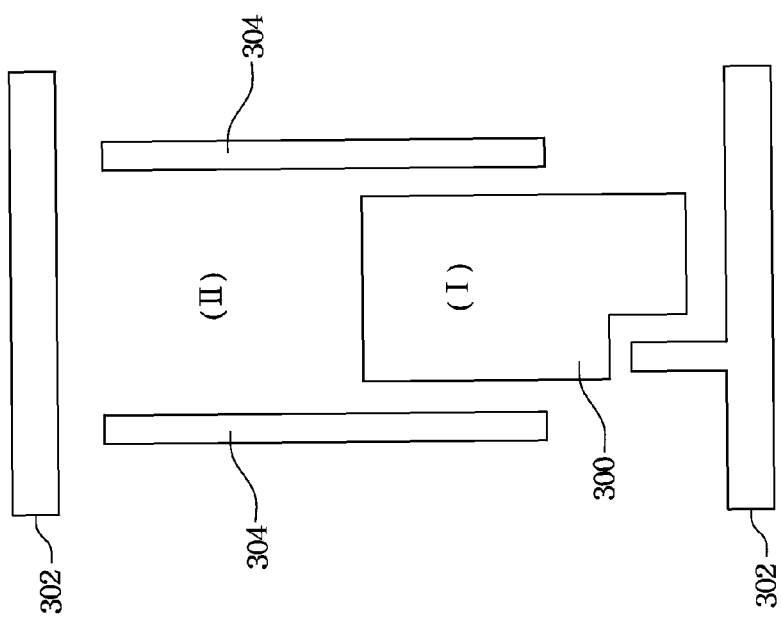

FIGS. 3A-3F illustrate a fabrication process of a transflective liquid crystal display array substrate according to another embodiment of the present invention. In the present embodiment, the pixel structure in the liquid crystal display array substrate includes a first area (I) and a second area (II) as well. Referring to FIG. 3A, a first patterned conductive layer is first formed on a substrate (not shown). The first patterned conductive layer includes a first part 300, a second part 302 and a third part 304. The first part 300 of the first patterned conductive layer is arranged in the first area (I) of the pixel structure and coupled to a pixel electrode voltage. The second part 302 of the first patterned conductive layer is used as a scan line of the liquid crystal display array substrate and also used as a gate electrode of a thin film transistor. The third part 304 of the first patterned conductive layer is used as a data line segment of the liquid crystal display array substrate. Then, a first interlayer dielectric layer (not shown) is formed to cover the first area (I) and the second area (II) of the pixel structure.

Referring to FIG. 3B, a patterned semiconductor layer 306, for example, amorphous silicon (α-Si), is then formed on the first interlayer dielectric layer over the aforementioned gate electrode, such that the thin film transistor can be formed as an α-Si thin film transistor. After that, a second patterned conductive layer is formed on the patterned semiconductor layer 306 and the first interlayer dielectric layer. The second patterned conductive layer includes a first part 310, a second part 312 and a third part 314. The first part 310 of the second patterned conductive layer is formed to cover the first interlayer dielectric layer of the first area (I) of the pixel structure and also used as a common line, coupled to the common electrode voltage, of the liquid crystal display array substrate. The first part 310 of the second patterned conductive layer together with the first part 300 of the first patterned conductive layer form a first storage capacitor $C_{ST1}$ (not shown) when they are coupled to the common electrode voltage and the pixel electrode voltage, respectively. The second part 312 of the second patterned conductive layer is used as a drain electrode of the thin film transistor and electrically connects with the first part 300 of the first patterned conductive layer. The third part 314 of the second patterned conductive layer is used as a source electrode of the thin film transistor and also used as an another data line segment of the liquid crystal display array substrate, so as to electrically connect with the third part 304 of the first patterned conductive layer to form the data line of the liquid crystal display array substrate. Then, a second interlayer dielectric layer (not shown) is formed to cover the foregoing structure in the first area (I) and the second area (II) of the pixel structure.

Referring to FIG. 3C, a patterned transparent conductive layer 320 is then formed on the second interlayer dielectric layer of the first area (I) and the second area (II), so as to form in the second area (II) a transparent part of the pixel structure in the transflective liquid crystal display array substrate. The material of the patterned transparent conductive layer 320 can include transparent conductive material such as Indium Tin Oxide (ITO), etc. Furthermore, the patterned transparent conductive layer 320 is coupled to the pixel electrode voltage. The patterned transparent conductive layer 320 and the first part 310 of the second patterned conductive layer, which is coupled to the common electrode voltage, form a second storage capacitor $C_{ST2}$ (not shown).

Referring to FIG. 3D, a passivation layer (not shown) is then formed to cover the foregoing structure in the first area (I) and the second area (II), in which the passivation layer has an opening 332 to expose a part of the patterned transparent conductive layer 320 in the second area (II). The passivation layer is etched to form the opening 232 and a contact hole 336a on the first part 300 of the first patterned conductive layer and the second part 312 of the second patterned conductive layer, and to form a plurality of contact holes 336b in the adjoining part between the third part 304 of the first patterned conductive layer and the third part 314 of the second patterned conductive layer.

Referring to FIG. 3E, the first interlayer dielectric layer on the first part 300 of the first patterned conductive layer and the second interlayer dielectric layer on the second part 312 of the second patterned conductive layer both are then etched, so as to form contact holes 340a under the contact hole 336a; the first interlayer dielectric layer on the third part 304 of the first patterned conductive layer and the second interlayer dielectric layer on the third part 314 of the second patterned conductive layer both are then etched, so as to form a plurality of contact holes 340b under the contact holes 336b.

Referring to FIG. 3F, a patterned reflective metal layer is then formed on the passivation layer, which includes a first part 350a and a second part 350b. The first part 350a of the patterned reflective metal layer is formed on the passivation layer in the first area (I) and the second area (II) to cover the contact hole 336a and the contact holes 340a on the first part 300 of the first patterned conductive layer and the second part 312 of the second patterned conductive layer, so as to form in the first area (I) a reflective part of the pixel structure in the transflective liquid crystal display array substrate, such that the first part 300 of the first patterned conductive layer electrically connects with the second part 312 of the second patterned conductive layer through the contact holes 340a and the first part 350a of the patterned reflective metal layer. The second part 350b of the patterned reflective metal layer is formed on the passivation layer over the data line to cover the contact holes 336b and the contact holes 340b on the third part 304 of the first patterned conductive layer and the third part 314 of the second patterned conductive layer, such that the third part 304 of the first patterned conductive layer electrically connects with the third part 314 of the second patterned conductive layer through the contact holes 340b and the second part 350b of the patterned reflective metal layer, to form the data line in the liquid crystal display array substrate. Moreover, the first part 350a of the patterned reflective metal layer can also electrically connect with the patterned transparent conductive layer 320 by being formed to cover the peripheral area of the opening 332 (dotted lines 338 shown in FIG. 3F).

For the foregoing embodiment of the present invention, the pixel structure of the transflective liquid crystal display array substrate and the method for fabricating the same can be used to provide more storage capacitance in the same pixel structure, such that the design for the storage capacitor is more flexible. Besides, the liquid crystal display can have better electrical characteristics, and the liquid crystal molecules can be more stable during the response time, as a result of the increased storage capacitance.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structures.

What is claimed is:

1. A pixel structure of a transflective liquid crystal display array substrate, comprising:
   a first patterned conductive layer formed on a substrate and having a first part coupled to a pixel electrode voltage;
   a first interlayer dielectric layer formed to cover the first patterned conductive layer;
   a second patterned conductive layer formed on the first interlayer dielectric layer and having a first part coupled to a common electrode voltage, the first part of the second patterned conductive layer together with the first part of the first patterned conductive layer forming a first storage capacitor;
   a second interlayer dielectric layer formed to cover the second patterned conductive layer;
   a patterned transparent conductive layer formed on the second interlayer dielectric layer and coupled to the pixel electrode voltage, the patterned transparent conductive layer together with the first part of the second patterned conductive layer forming a second storage capacitor;
   a passivation layer formed to cover the patterned transparent conductive layer and the substrate, the passivation layer having an opening to expose a part of the patterned transparent conductive layer; and
   a patterned reflective metal layer formed to cover the passivation layer and electrically connected with the patterned transparent conductive layer via the opening.

2. The pixel structure as claimed in claim 1, wherein the second patterned conductive layer has a second part electrically connected with the first part of the first patterned conductive layer via at least one first contact hole in the first interlayer dielectric layer.

3. The pixel structure as claimed in claim 1, wherein the second patterned conductive layer has a second part electrically connected with the patterned transparent conductive layer via at least one second contact hole in the second interlayer dielectric layer.

4. The pixel structure as claimed in claim 1, wherein the passivation layer has a plurality of third contact holes on the first part of the first patterned conductive layer and a second part of the second patterned conductive layer and on a third part of the first patterned conductive layer and a third part of the second patterned conductive layer, respectively; and
   wherein the patterned reflective metal layer has a first part and a second part, and the first part of the first patterned conductive layer electrically connects with the second part of the second patterned conductive layer through the first part of the patterned reflective metal layer, the third part of the first patterned conductive layer electrically connects with the third part of the second patterned conductive layer through the second part of the patterned reflective metal layer, and the first part of the patterned reflective metal layer electrically connects with the patterned transparent conductive layer.

5. The pixel structure as claimed in claim 1, wherein the first patterned conductive layer, the first interlayer dielectric layer, the second patterned conductive layer, the second interlayer dielectric layer and the patterned transparent conductive layer are arranged in between the patterned reflective metal layer and the substrate.

6. A method for fabricating a transflective liquid crystal display array substrate, the method comprising:
   forming a first patterned conductive layer on a substrate, wherein the first patterned conductive layer has a first part coupled to a pixel electrode voltage;
   forming a first interlayer dielectric layer to cover the first patterned conductive layer;
   forming a second patterned conductive layer on the first interlayer dielectric layer, wherein the second patterned conductive layer has a first part coupled to a common electrode voltage, and the first part of the second patterned conductive layer together with the first part of the first patterned conductive layer form a first storage capacitor;
   forming a second interlayer dielectric layer to cover the second patterned conductive layer;
   forming a patterned transparent conductive layer on the second interlayer dielectric layer, wherein the patterned transparent conductive layer is coupled to the pixel electrode voltage, and the patterned transparent conductive layer together with the first part of the second patterned conductive layer form a second storage capacitor;
   forming a passivation layer on the patterned transparent conductive layer;
   etching the passivation layer to form an opening to expose a part of the patterned transparent conductive layer; and
   forming a patterned reflective metal layer to cover the passivation layer, wherein the patterned reflective metal layer electrically connects with the patterned transparent conductive layer via the opening.

7. The method as claimed in claim 6, further comprising:
   etching the first interlayer dielectric layer to form at least one first contact hole, such that the first part of the first patterned conductive layer electrically connects with a second part of the second patterned conductive layer through the first contact hole.

8. The method as claimed in claim 6, further comprising:
   etching the second interlayer dielectric layer to form at least one second contact hole, such that a second part of the second patterned conductive layer electrically connects with the patterned transparent conductive layer through the second contact hole.

9. The method as claimed in claim 6, further comprising:
   etching the passivation layer to form a plurality of third contact holes on the first part of the first patterned conductive layer and a second part of the second patterned conductive layer and on a third part of the first patterned conductive layer and a third part of the second patterned conductive layer, respectively;
   wherein the patterned reflective metal layer has a first part and a second part, such that the first part of the first patterned conductive layer electrically connects with the second part of the second patterned conductive layer through the first part of the patterned reflective metal layer, the third part of the first patterned conductive layer electrically connects with the third part of the second patterned conductive layer through and the second part of the patterned reflective metal layer, and the first part of the patterned reflective metal layer electrically connects with the patterned transparent conductive layer.

10. The method as claimed in claim 6, wherein the first patterned conductive layer, the first interlayer dielectric layer, the second patterned conductive layer, the second interlayer dielectric layer and the patterned transparent conductive layer are arranged in between the patterned reflective metal layer and the substrate.

* * * * *